United States Patent [19]
Bentz et al.

[11] Patent Number: 4,966,108
[45] Date of Patent: Oct. 30, 1990

[54] SINTERED CERAMIC BALL AND SOCKET JOINT ASSEMBLY

[75] Inventors: Joseph C. Bentz; Thomas M. Yonushonis; James W. Patten, all of Columbus, Ind.; Yuji Fujimoto, Yokohama, Japan

[73] Assignee: Cummins Engine Company, Inc., Columbus, Ind.

[21] Appl. No.: 344,743

[22] Filed: Apr. 28, 1989

[51] Int. Cl.[5] ............................ F01L 1/14; F16C 11/00
[52] U.S. Cl. ..................... 123/90.51; 74/569; 123/90.61; 123/508; 384/907.1; 403/76; 403/122
[58] Field of Search ................. 123/90.51, 90.61, 507, 123/508, 509, 496; 74/569; 384/907.1; 403/76, 122, 404, 24

[56] References Cited

U.S. PATENT DOCUMENTS

| | | | |
|---|---|---|---|
| 4,184,213 | 1/1980 | Heimke | 128/92 C |
| 4,325,647 | 4/1982 | Maier et al. | 403/29 |
| 4,366,785 | 1/1983 | Goloff et al. | 123/90.51 |
| 4,419,977 | 12/1983 | Hillebrand | 123/508 |
| 4,453,505 | 6/1984 | Holtzberg et al. | 123/90.61 |
| 4,508,067 | 4/1985 | Fuhrmann | 123/90.51 |
| 4,614,453 | 9/1986 | Tsuno et al. | 74/572 |
| 4,615,990 | 10/1986 | Richon et al. | 501/97 |
| 4,629,707 | 12/1986 | Wolfe | 501/98 |
| 4,643,144 | 2/1987 | Fingerle et al. | 123/90.51 |
| 4,719,187 | 1/1988 | Bardhan et al. | 501/98 |
| 4,794,894 | 1/1989 | Gill | 123/90.61 |
| 4,806,040 | 2/1989 | Gill et al. | 403/124 |
| 4,848,286 | 7/1989 | Bentz | 123/90.51 |

FOREIGN PATENT DOCUMENTS

| | | | |
|---|---|---|---|
| 0046025 | 3/1980 | Japan | 123/90.61 |
| 0013204 | 1/1982 | Japan | 123/90.61 |
| 0210111 | 12/1982 | Japan | 123/90.61 |
| 2127928 | 4/1984 | United Kingdom | 123/90.51 |

*Primary Examiner*—Charles J. Myhre
*Assistant Examiner*—Weilun Lo
*Attorney, Agent, or Firm*—Sixbey, Friedman, Leedom & Ferguson

[57] ABSTRACT

A ceramic-metallic interfacing joint assembly is disclosed. The joint assembly includes a pair of interfaced components in a highly loaded, sliding contact in which the contact stresses can be as high as 250,000 psi. Preferably, the pair of interfaced components includes a ball member and a complementarily shaped, mating socket member and is used in a diesel type internal combustion engine. One of the components is formed of a ceramic material having a density of at least 3.18 g/cm$^3$ and the other component is formed of a metallic material. Preferably, the density of the ceramic material ranges from 3.18 g/cm$^3$ to 3.25 g/cm$^3$. This arrangement reduces the wear of the joint assembly in conjunction with the use of a lubricant which lubricates the components. Specifically, the metallic material is an iron based material while the ceramic material is a sintered silicon nitride. The ceramic material may be sintered with rare-earth metal oxides such as yttrium oxide. Alternately, the ceramic material may be sintered using aluminum oxides.

18 Claims, 2 Drawing Sheets

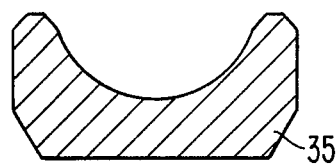
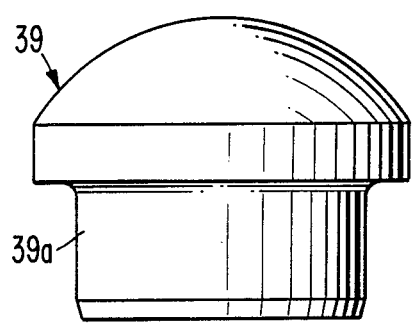
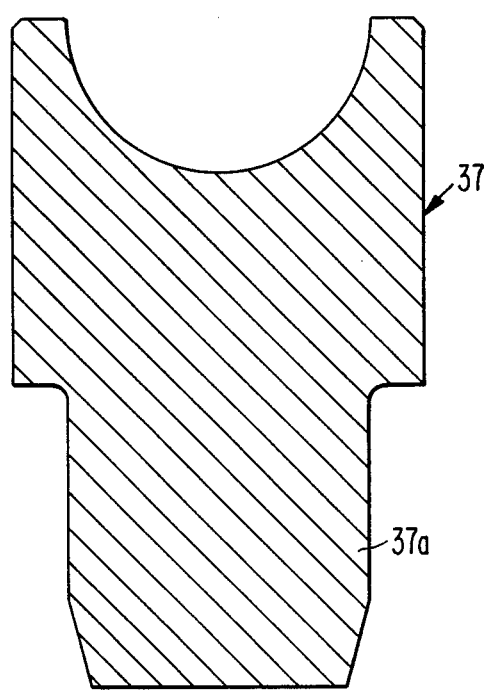

SINTERED CERAMIC BALL AND SOCKET JOINT ASSEMBLY

TECHNICAL FIELD

The present invention relates to ball and socket joint assemblies, such as ball and socket joint assemblies of the type used in internal combustion engines. More particularly, the present invention relates to ball and socket joint assemblies found in fuel injector valve drive trains and engine cylinder valve drive trains.

BACKGROUND OF THE INVENTION

It has been conventional for a long time to include ball and socket components in the drive trains of unit injectors and valves of internal combustion engines. Such drive trains normally include a tubular shaft (push rod) into the ends of which pivot contact members constructed of a hardened material are plugged. However, the high compressive loads imposed between the ball and the socket components of push rods of such engine sub-system drive trains can result (within as little as 20,000 to 30,000 miles) in the surfaces of a ball and/or socket becoming worn to such an extent that undesirably large amounts of play occur which adversely impact upon the operation of the associated fuel injectors and valves. This occurs even with the hardened metallic surfaces of the ball and socket connection. Such wear is most common with either lower quality lubricating oils or with good quality lubricating oil in which anti-wear additives have become either depleted or inhibited in their normal functioning due to oil contamination during the course of its use in an engine. When such wear occurs, it is necessary to perform major servicing of the engine, and the associated vehicle must be taken out of use for a day or more.

Ball and socket joints for internal combustion engines, such as diesel engines, must exhibit a variety of desirable characteristics in order to satisfy the needs of modern day engines. For example, such ball and socket joints must exhibit outstanding wear characteristics, must have high strength properties, must be capable of withstanding thermal shock and corrosive environments, and, most importantly, must be able to retain these desirable characteristics at the high temperatures commonly encountered in internal combustion engine operations. Typically, such ball and socket joints are formed of metals, such as tool steel. However, despite their many desirable characteristics, metal joints exhibit significantly reduced strength characteristics at elevated temperatures.

It has been found that the use of ceramic components can produce a dramatic reduction in wear to such an extent that, even with a metal socket—ceramic ball combination, a life of as much as 500,000 miles can be expected before an unacceptable amount of wear occurs. This is an increase of as much as 20 times the life of prior art metal-to-metal ball and socket joints. Thus, a definite advantage can be achieved if the pivot insert plugs for push rods and the like are made of a wear resisting ceramic material.

The use of wear resisting ceramic material in connection with ball and socket joints is found in U.S. Pat. No. 4,184,213 to Heimke which discloses a ball and socket assembly wherein the bearing surfaces are coated with aluminum oxide ceramic and anchoring elements are composed of silicon nitride. Heimke's use of frictional components manufactured of ceramic is designed to avoid wear phenomena on the articulating surfaces of an articulatory endoprosthetic ball and socket joint. However, Heimke does not disclose a component designed to reduce the wear of highly loaded mechanical interfaces where contact stresses can be as high as 250,000 psi, such as in diesel type internal combustion engines. Nor does Heimke disclose the use of a joint lubricant, or of a ceramic which is sintered using sintering additives.

Japanese Printed Patent Document No. 57 13204(A) issued Jan. 23, 1982 to Kawamura discloses the use of ceramic in the joints formed at each end of a push rod. This Japanese patent document does not suggest the use of a ceramic to metal joint contact surface.

U.S. Pat. No. 4,719,187 to Bardhan et al. discloses the production of dense sintered ceramic bodies of silicon nitride densified by the addition of yttrium oxide, rare-earth metals, or aluminum oxides; the ceramic bodies exhibit excellent mechanical strength. However, Bardhan does not apply these ceramic bodies to ball and socket arrangements including joint lubrication.

U.S. Pat. No. 4,629,707 to Wolfe discloses a high strength, low weight, silicon nitride based article including the use of a lubricating material to form a self-lubricating material as a bearing replacement. However, Wolfe's ceramic compositions are relatively porous (10–37%) and would not likely have sufficient strength to be used in heavy-duty diesel engine ball-sockets.

Richon et al., U.S. Pat. No. 4,615,990, is directed to compositional details for obtaining highly dense, high strength silicon nitride.

None of these prior art references reduces the wear of highly loaded mechanical interfaces in diesel engines where contact stresses can be as high as 250,000 psi.

SUMMARY OF THE INVENTION

It is an object of the present invention to provide a high strength, high density ceramic ball or socket which is interfaced with a metal counterpart to reduce the wear in a joint assembly.

It is a further object of the present invention to provide a sintered silicon nitride ball or socket which is interfaced with a metal counterpart wherein the silicon nitride component retains geometry and does not weld, gall, or otherwise damage the metallic interface.

It is yet another object of the present invention to provide a joint assembly including a pair of interfaced components in highly loaded, sliding contact wherein contact stresses can be as high as 250,000 psi and wherein one of the components is formed of a ceramic material and the other of the components is formed of a metallic material for reducing the wear of the joint assembly when lubricated with diesel lubricants.

A further object of the present invention is to provide a ball and socket joint for use in an internal combustion engine wherein the combination of one component being formed of silicon nitride and the other component being formed of metallic material yields improved performance and reduction of wear in the joint at contact stresses over 20,000 psi, especially at contact stresses between 80,000 psi and 120,000 psi which is the typical range for ball and socket joints of this type.

These and other objects are attained by the joint assembly according to the present invention. The joint assembly includes a pair of interfaced components in a highly loaded sliding contact in which the contact stresses can be as high as 250,000 psi. Preferably, the pair of interfaced components includes a ball member and a complementarily shaped, mating socket member and the joint assembly is used in a diesel type internal combustion engine subject to contact stresses ranging between 80,000 psi and 120,000 psi. One of the components is formed of a ceramic material having a density of at least 3.18 g/cm$^3$ and the other component is formed of a metallic material. Preferably, the density of the ceramic material ranges from 3.18 g/cm$^3$ to 3.25 g/cm$^3$. This arrangement reduces the wear of the joint assembly in conjunction with the use of a lubricant which lubricates the components.

Specifically, the metallic material is an iron based material while the ceramic material is a sintered silicon nitride. The ceramic material may be sintered with rare earth metals such as yttrium oxide. Alternately, the ceramic material may be sintered using aluminum oxides.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

BRIEF DESCRIPTION OF THE DRAWINGS

FIG. 3 is a sectional view of a socket portion of a joint assembly according to the present invention.

FIG. 4 is a sectional view of another type of socket portion of a joint assembly according to the present invention.

FIG. 5 is a side view of a ball portion of a joint assembly according to the present invention.

DETAILED DESCRIPTION OF PREFERRED EMBODIMENTS

Figure 1:
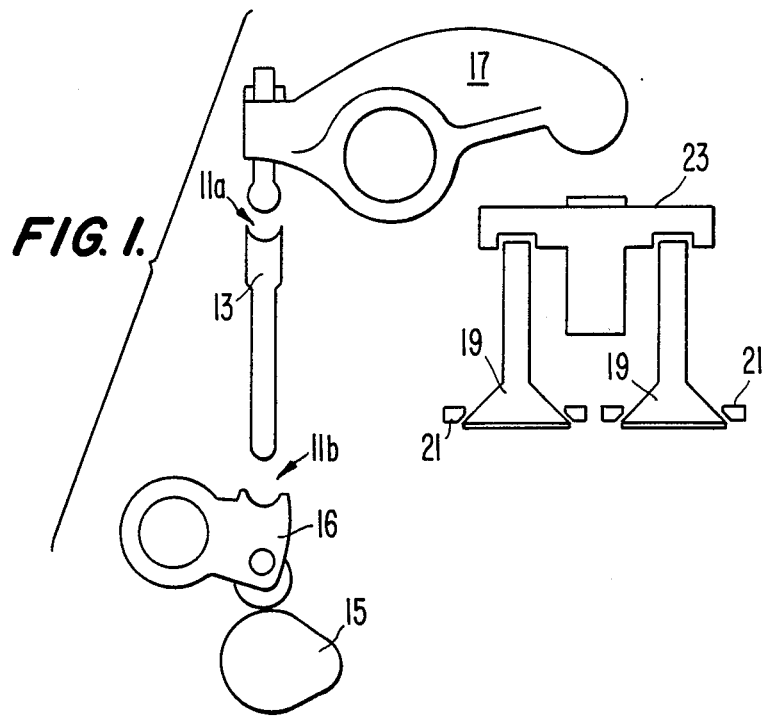
FIG. 1 is a schematic view of a cylinder head valve incorporating a joint assembly according to the present invention.
Figure 2:
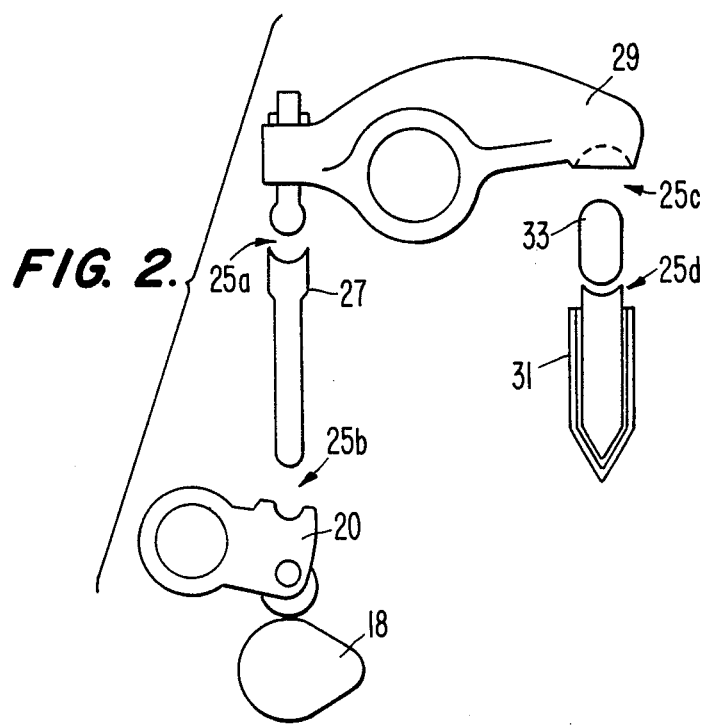
FIG. 2 is a schematic view of a fuel injector drive train incorporating a joint assembly according to the present invention.

It has been found that in drive trains of the type schematically shown in FIGS. 1 and 2, ceramic ball and socket joints can increase the compressive loads to which such joints may be subjected and simultaneously reduce the wear which results. FIG. 1 depicts an engine cylinder head valve drive train wherein ball and socket joints 11a and 11b are provided at each of the opposite ends of push rod 13 used to transmit movement produced by cam 15 and pivotal cam follower 16 to valve rocker arm 17. Rocker arm 17 seats and unseats valves 19 with respect to valve seat inserts 21 via cross head 23.

FIG. 2 shows a fuel injector drive train having four ball and socket joints 25a, 25b, 25c, 25d. The first pair of joints 25a and 25b is disposed at opposite ends of push rod 27 in a manner similar to that for push rod 13 of the arrangement of FIG. 1. Motion is transmitted from cam 18 and pivotal cam follower 20 through push tube 27, injector rocker arm 29, and modified push rod 33 to injector plunger 31. Opposite ends of rod 33 forms the ball parts for a pair of ball and socket joints 25c and 25d.

While the present invention finds particular utility in drive trains of the type shown in FIGS. 1 and 2 wherein high loads are experienced, e.g, up to 250,000 psi, servicing of the ball and socket joints is costly and time consuming, and the required frequency of servicing can be an important factor in the choice of an engine for a vehicle or piece of equipment of which it is a part. The joint assembly of the present invention also finds utility in numerous other environments which have similar requirements. Furthermore, while push rods 13, 27 include a ball portion and a socket portion disposed on opposite ends of the push rod, depending upon the application, a push rod may have two ball pivot portions (such as for push rod 33 of FIG. 2), two socket portions, or only a single ball or socket portion.

As shown in FIGS. 1 and 2, joint assemblies 11 and 25 are ball and socket joints. A substantially spherical ball portion resides in a complementarily shaped, mating socket portion. The ball and socket are in a highly loaded, sliding contact and the stresses in these valve and fuel injector drive trains range between 80,000 psi and 120,000 psi. In accordance with the subject invention, either the ball portion or the socket portion is formed of a ceramic material sintered to a high density ranging from 3.18 g/cm$^3$ to 3.25 g/cm$^3$ and the other component is formed of an iron based metallic material such as steel. The ceramic material is preferably a sintered silicon nitride that is sintered with aluminum oxides or rare earth metal oxides such as yttrium oxide. These materials, when used in this fashion in a ball and socket joint assembly, reduce the wear of the assembly in conjunction with the use of a heavy duty diesel lubricant which lubricates the components. The lubricant may include an EP additive to mitigate wear at extreme pressures and boundary lubricated conditions. Thus, the ceramic-to-metal bearing interface of this ball and socket joint assembly, when highly loaded in the environment of a diesel engine which uses typical diesel engine lubricating oils, wears less than a geometrically similar conventional metal-to-metal interface. The ceramic material retains the geometry without welding, galling, or otherwise damaging the metallic interface, even when subjected to contact stresses as high as 250,000 psi.

FIGS. 3, 4, and 5 illustrate socket portions and a ball portion incorporating the teachings of this invention and usable with the systems shown in FIGS. 1 and 2. FIG. 3 shows a typical socket portion 35 which is press fit into rocker arms 29 and roller-type camshaft follower levers. Socket portion 35 can be either ceramic or metallic to interface with a ball portion of the opposite composition. FIG. 4 shows a different type of socket portion 37 having a reduced diameter lower portion 37a which can be press fit to a long hollow tube such as pushrods 13, 27. Socket portion 37 also can be either ceramic or metallic to interface with a ball portion of the opposite composition. FIG. 5 shows ball portion 39 having a reduced diameter lower portion 39a which may be either ceramic or metallic and which can be attached to a tube such as push rods 13, 27. Alternately, socket portion 35, socket portion 37, and ball portion 39, can be machined on the end of the appropriate ceramic or metallic components as one integral member.

The ceramic-metallic ball and socket valve assembly of the present invention is able to withstand the high compressive loads imposed between the ball and socket components of the joint assembly. Using ball portion 39 with socket portion 35 or socket portion 37 where one component is a sintered ceramic and the other is an iron based metal eliminates the wear in the surfaces of the ball portion and/or the socket portion that otherwise occurred in drive trains as frequently as every 20,000 to 30,000 miles; the large amounts of play that are created and caused by the wear, decreasing the performance of the associated fuel injectors and valves is also eliminated. These advantages of the present invention exist even when lower quality lubricating oils are used or when the antiwear additives in good quality lubricating oils have been depleted. Thus, major servicing of the vehicle incorporating these joint assemblies, and the concomitant loss of use of the vehicle are avoided. By pairing ball portion 39 with either socket portion 35 or socket portion 37 in a joint assembly using the ceramic and metallic materials as discussed above, the joint assembly exhibits outstanding wear characteristics, has high strength properties, can withstand thermal shock and corrosive environments, and retains these features at the high temperatures commonly encountered in internal combustion engine operations. The joint assembly designed in accordance with the invention may be employed in over-the-road vehicle engines and can be expected to operate maintenance free for up to the 500,000 miles or more of vehicle travel before unacceptably large wear occurs. Such service life represents up to a twenty-fold increase over all metal ball and socket joint assemblies used in similar circumstances.

Numerous characteristics, advantages, and embodiments of the invention have been described in detail in the foregoing description with reference to the accompanying drawings. However, the disclosure is illustrative only and the invention is not limited to the precise illustrated embodiments. Various changes and modifications may be effected therein by one skilled in the art without departing from the scope or spirit of the invention.

INDUSTRIAL APPLICABILITY

The present invention finds utility in cylinder head valve and fuel injector drive train components for engines such as diesel engines. The present invention also is applicable to any high contact stress environment requiring a joint assembly such as a ball and socket assembly and to environments where the value of a dramatically increased wear-free life outweighs the costs associated with using ceramic materials that are more expensive than conventionally used metals.

We claim:

1. A joint assembly for use in an internal combustion engine, said engine including a substantially spherical ball member and a complementarily shaped mating socket member, said ball member and said socket member being in highly loaded, sliding contact wherein contact stresses are between 80,000 psi and 120,000 psi, one of said ball member and said socket member being formed of a ceramic material sintered to a high density of at least 3.18 g/cm$^3$, and the other of said ball member and said socket member being formed of metal material wherein the ceramic-metal interface reduces wear of said joint assembly.

2. The joint assembly as claimed in claim 1 wherein said joint assembly is used in a fuel injector drive train.

3. The joint assembly as claimed in claim 1 wherein said joint assembly is used in an engine cylinder head valve drive train.

4. The joint assembly as claimed in claim 1 wherein the density of said ceramic material ranges from 3.18 g/cm$^3$ to 3.25 g/cm$^3$.

5. The joint assembly as claimed in claim 4 wherein said ceramic material comprises silicon nitride sintered with rare-earth metal oxides.

6. The joint assembly as claimed in claim 5 wherein said rare-earth metal comprises yttrium oxide.

7. The joint assembly as claimed in claim 4 wherein said ceramic material comprises silicon nitride sintered with an aluminum oxide.

8. The joint assembly as claimed in claim 4 wherein said metallic material is iron based.

9. The joint assembly as claimed in claim 8 wherein the wear of said joint assembly is reduced in conjunction with the use of lubricant for lubricating said ball member and said socket member.

10. A highly wear resistant joint assembly for use in a high load environment of an internal combustion engine wherein contact stresses are on the order of 250,000 psi comprising engine component members including a pair of correspondingly configured joint components directly interfaced in highly loaded, sliding contact, a first of said components being formed of a highly wear resistant ceramic material having a high density of at least 3.18 b/cm$^3$ and a second of said components being formed of a metallic material selected to enhance the wear resistance of the ceramic-to-metal interface.

11. The joint assembly described in claim 10, wherein the density of said ceramic material is within the range of 3.18 g/cm$^3$ to 3.25 g/cm$^3$.

12. The joint assembly described in claim 11, wherein said ceramic material is selected from the group consisting of silicon nitride sintered with a rare earth metal oxide and silicon nitride sintered with an aluminum oxide.

13. The joint assembly described in claim 12, wherein the rare earth metal oxide is yttrium oxide.

14. The joint assembly described in claim 12, wherein said metallic material is iron based steel.

15. The joint assembly described in claim 14, wherein one of said components is a substantially spherically shaped ball and the other of said components is a mating socket correspondingly configured to receive said ball.

16. A joint assembly as described in claim 15, wherein the wear resistance of said joint assembly components remains high in an internal combustion environment characterized by semi-starvation quantities of lubricating oil or degraded quality lubricating oil.

17. The joint assembly as claimed in claim 10, wherein said joint assembly is used in a fuel injector drive train.

18. The joint assembly as claimed in claim 10, wherein said joint assembly is used in an engine cylinder head valve drive train.

* * * * *

UNITED STATES PATENT AND TRADEMARK OFFICE
CERTIFICATE OF CORRECTION

PATENT NO. : 4,966,108

DATED : October 30, 1990

INVENTOR(S) : Joseph C. Bentz; Thomas M. Yonushonis; James W. Patten; Yuji Fujimoto It is certified that error appears in the above-identified patent and that said Letters Patent is hereby corrected as shown below:

On the title page, item [73] Assignee: please add the following:

-- KABUSHIKI KAISYA TOSHIBA, INC.,
Dawaskai-city, Kanagawa, JAPAN. --

Signed and Sealed this

Twenty-eighth Day of July, 1992

Attest:

DOUGLAS B. COMER

*Attesting Officer*     *Acting Commissioner of Patents and Trademarks*